United States Patent [19]

McTyre

[11] Patent Number: 4,635,496

[45] Date of Patent: Jan. 13, 1987

[54] ATTACHMENT FOR A DISPLAY POSITION INDICATOR

[76] Inventor: Scott B. McTyre, 9640 Topanga Canyon Pl., Suite H, Chatsworth, Calif. 91311

[21] Appl. No.: 724,621

[22] Filed: Apr. 18, 1985

[51] Int. Cl.⁴ .............................................. G05G 9/04
[52] U.S. Cl. .................................. 74/471 XY; 16/26; 74/198; 248/346; 273/148 B; 340/710
[58] Field of Search .......................... 74/471 XY, 198; 273/148 B; 340/710; 248/346; 16/26; 33/18 R, 141 R

[56] References Cited

U.S. PATENT DOCUMENTS

| | | | |
|---|---|---|---|
| 2,810,960 | 10/1957 | Johnson et al. | 33/18 R |
| 2,830,824 | 4/1958 | Young | 16/26 X |
| 3,625,083 | 10/1969 | Bose | 74/471 XY |
| 3,744,083 | 7/1973 | Jenkins | 16/26 |
| 3,835,464 | 9/1974 | Rider | 74/198 X |
| 3,892,963 | 1/1975 | Halwey et al. | 250/231 R |
| 3,987,685 | 10/1976 | Opolensky | 340/710 X |
| 4,369,439 | 1/1983 | Broos | 340/710 |
| 4,464,652 | 8/1984 | Lapson et al. | 340/710 |

Primary Examiner—Allan D. Herrmann
Attorney, Agent, or Firm—Spensley Horn Jubas & Lubitz

[57] ABSTRACT

The invention provides a holder for a position indicator device used to position a cursor on a visual display. The holder comprises a rectangular base member having rotatably-mounted ball bearings and apertures adapted to allow the spherical transport ball of the position indicator device to come in contact with a supporting surface. When the holder is coupled to the position indicator, only the ball bearings and transport ball make contact with the supporting surface, thereby providing for smoother and faster movement of the position indicator and correspondingly more accurate positioning of the associated cursor.

6 Claims, 4 Drawing Figures

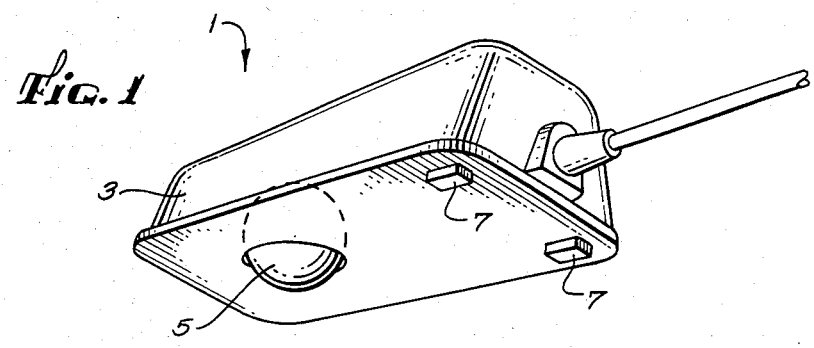
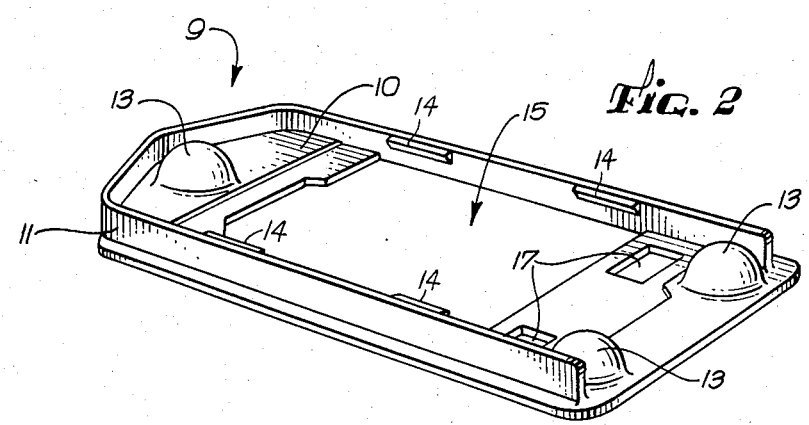
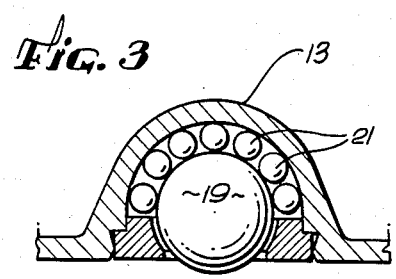
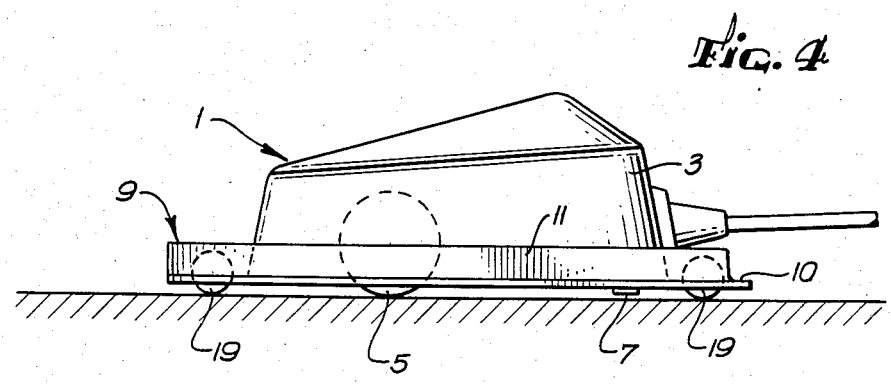

ATTACHMENT FOR A DISPLAY POSITION INDICATOR

BACKGROUND OF THE INVENTION

1. Field of the Invention

This invention relates to attachments for display position indicators, and more particularly to a holder for such an indicator which utilizes ball bearing-mounted spheres in order to provide for smoother and faster movement of the indicator and thereby enable more accurate positioning of a cursor on a display screen.

2. Prior Art

U.S. Pat. No. 3,835,464 to Rider, incorporated herein by reference, discloses a typical position indicator used to control the movement of a cursor on the visual display of a cathode ray tube. Such a position indicator device is commonly referred to as a "mouse". The mouse generates signals indicative of its position on a supporting surface such as a desk top, which causes the cursor on the screen to be moved in a manner corresponding to the movement of the mouse on the supporting surface. The mouse includes a control mechanism that comprises a transport sphere which is in contact with position wheels indicative of Cartesian coordinates. The movement of the mouse over the supporting surface causes the sphere to rotate about its radius. The radial rotation of the sphere is in turn translated into Cartesian coordinates by the resulting movement of the position wheels which are in contact with the sphere. These coordinates are used to reposition the cursor on the display screen accordingly.

A positioning device such as that disclosed in Rider provides an easy method for positioning a cursor on a visual display. These devices have proved very useful when used in conjunction with many of the personal computers now commercially available, such as the Lisa or Macintosh made by Apple Computer. The devices are especially well-suited to graphic applications in which the mouse acts as a kind of electronic "brush" which allows a user to create his own visual images on the video display "canvass". Such devices can also be used in word-processing applications and with entertainment and data base programs.

Because the spherical transport ball of the mouse extends beyond the housing in which it is situated, the device requires some type of stablizing means so as to provide for even support of the mouse and to keep the housing itself off of the supporting surface. In order to accomplish this, most mouse devices have stabilizing structures known as "feet" which are mounted to the bottom of the housing and come in contact with the supporting surface. With the addition of two such feet a tripodal support arrangement can be provided using the spherical transport ball as the third leg of the tripod.

However, the tripod arrangement as well as other such stabilization configurations have the drawback that the feet wear out after repeated uses of the mouse. When this happens, movement of the mouse is made more difficult. Therefore, it is one object of the present invention to provide a device that can be attached to a mouse in order to provide stability as well as to protect the feet of the device from wearing out.

It is a further object of the present invention to provide a means for reducing the friction between the mouse and the supporting surface, thereby allowing movement of the mouse with less effort and providing for greater control of the movement of the mouse and associated cursor positioning.

It is still another object of the present invention to allow a mouse to move over rougher surfaces with greater ease and with less effort than would normally be possible because of the friction created by the rubbing of the feet over the surface.

Other objects of the present invention will be evident from the description hereinafter presented.

SUMMARY OF THE INVENTION

The present invention comprises a substantially rectangular plastic holder made for attachment to a mouse device. The holder consists of a flat surface with openings for the spherical transport ball of the mouse and for the two feet attached to the device housing. The design of the holder is such that the spherical ball is allowed to make contact with the supporting surface but the feet remain a short distance above such surface.

The holder also contains ball bearings at three points which effect a tripod-like arrangement. Each of these ball bearings is attached to the holder by means of housings containing smaller ball bearings which allow the larger bearings to move freely within the housings. The larger ball bearings are the ones which actually come in contact with the supporting surface.

Such a holder when used in conjunction with the mouse allows the mouse to be moved over any type of surface in a smooth manner and with less effort on the part of the user. This is important since the smoother the movement of the mouse the more accurate the positioning of the cursor on the video display. Accurate positioning of the cursor is especially crucial when the mouse is being used to create graphic images on the display.

These and other features which are considered to be characteristic of this invention are set forth with particularity in the appended claims. The invention itself, however, as well as additional objects and advantages thereof, will best be understood in the following description when considered in conjunction with the accompanying drawings.

DESCRIPTION OF THE DRAWINGS

FIG. 1 is a bottom perspective view of a position indicator device capable of utilizing the present invention.

FIG. 2 is a top perspective view of an attachment according to the present invention to be used in conjunction with the position indicator shown in FIG. 1.

FIG. 3 is a side view illustrating how the attachment of FIG. 2 may be combined with the position indicator of FIG. 1.

FIG. 4 is a cross-sectional view of one of the ball bearings shown in FIG. 2.

DESCRIPTION OF THE PREFERRED EMBODIMENT

In FIG. 1 is shown a position indicator mouse device which can be used in conjunction with the present invention. The indicator device 1 is comprised of a housing 3 and a transport sphere 5. In addition, the underside of the housing contains two relatively small feet 7 used to stabilize the device 1. Since such mouse devices are well known in the art, further description is not believed necessary.

FIG. 2 shows the mouse device holder 9 according to the present invention. The holder 9 is made of plastic but could be made of many other materials including aluminum. The holder 9 consists of a substantially rectangular planar base 10 of plastic having a slightly pointed portion at one end. Two side walls 11 each having two inwardly projecting tabs 14 are perpendicularly attached along the length of the base 10 and engage the mouse device 1 in order to hold the mouse device 1 securely on the base 10.

A large rectangular aperture 15 is located approximately in the middle of the base 10 so as to allow the exposed portion of the sphere 5 to extend through the bottom of the base 10 and come in contact with a supporting surface. Two smaller rectangular apertures 17 are located near the large aperture 15 which allow the feet 7 of the mouse device 1 to extend through the base 10. The smaller apertures 17 are such that the feet 7 extend through the base 10 but do not come in contact with the supporting surface. This is perhaps best seen in FIG. 4.

Three concave ball bearing housings 13 are arranged on the base 10 such that one housing is located in the middle of the pointed end of the base 10, and the other two are located parallel to one another at the opposite end of the base 10. These three ball bearing housings 13 form a tripod configuration in order to provide a stable foundation when the holder 9 is attached to the mouse device 1.

As shown in FIG. 3, each ball bearing housing 13 contains a large one-fourth inch input ball bearing 19. To assure minimum rotational friction and minimum wear on the large ball bearing 19, the ball 19 is seated in a plurality of small rotatable ball bearings 21. All of the smaller ball bearings 21 are identical in size and may be made of any suitable bearing material such as steel or nylon. The small ball bearings 21 are randomly placed in the spherically concave cup formed by the housing 13.

FIG. 4 shows the mouse device 1 coupled to the holder 9. In this configuration only the sphere 5 and the large ball bearings 19 are in contact with the supporting surface. The feet 7 of the position indicator 1 are slightly elevated off of the supporting surface so as to reduce the amount of friction encountered when moving the mouse device 1 over the supporting surface.

While the holder 9 is disclosed herein as being removably joined to the mouse device 1, such holder 9 could also be incorporated directly into and made part of, the mouse device 1.

Obviously, many other modifications of the present invention are possible in light of the above teachings. It is therefore to be understood that, in the scope of the appended claims, the invention may be practiced other than as specifically described.

What is claimed is:

1. A holder for a visual display position indicator, said holder comprising:
 a substantially planar base defining a series of apertures wherein said apertures comprise one aperture adapted to allow a transport sphere of said indicator to extend through said holder and come in contact with a supporting surface, and at least two apertures adapted to receive support feet of said indicator but preventing said support feet from making contact with said supporting surface;
 side members located along the length of said base and perpendicular thereto for securing said indicator to said holder; and
 a plurality of rotatable bearing means joined to said base, such that said holder can be readily moved across a supporting surface.

2. The holder of claim 1, wherein said bearing means are attached to said base in a tripodal arrangemet.

3. The holder of claims 1 or 2, wherein each said rotatable bearing means comprises a spherical input ball depending from said base.

4. A holder for a visual display positioning indicator having a transport sphere, said holder comprising:
 a substantially flat base defining a centrally located aperture having a width or diameter greater than the diameter of said transport sphere such that said transport sphere can extend therethrough and make contact with a supporting surface; and
 a plurality of bearing housings attached to said base and a centrally located input ball bearing disposed in each said housing, said input ball bearing depending from said holder and enabling said holder to be readily moved across a supporting surface.

5. In a visual display position indicator having a transport sphere and support feet, the improvement comprising a holder joined to said indicator such that said transport sphere extends therethrough and said support feet extending therethrough are prevented from making contact with a supporting surface, and a plurality of rotatable ball bearing means along with said transport sphere enable said indicator to be readily moved across a supporting surface.

6. The display indicator of claim 5 wherein each said rotatable ball bearing means comprises a large input ball depending from said holder and disposed in a nest of smaller ball bearings.

* * * * *